United States Patent [19]

Kitahama et al.

[11] Patent Number: 5,344,369
[45] Date of Patent: Sep. 6, 1994

[54] V-BELT FOR POWER TRANSMISSION

[76] Inventors: Koji Kitahama; Masahiko Kawashima; Kyoichi Mishima, all of c/o Mitsuboshi Belting Ltd., P.O. Box 27, Nagata, Kobe, Japan

[21] Appl. No.: 107,501

[22] Filed: Aug. 16, 1993

[30] Foreign Application Priority Data

Aug. 18, 1992 [JP] Japan .................. 4-063591[U]

[51] Int. Cl.$^5$ ............................................. F16G 3/10
[52] U.S. Cl. ..................................... 474/253; 474/258
[58] Field of Search ................ 474/253, 258, 264–268

[56] References Cited

U.S. PATENT DOCUMENTS

| 311,242 | 1/1885 | Gandy . |
| 1,255,594 | 2/1918 | Geisel ................................ 474/258 |
| 2,039,258 | 4/1936 | Patterson . |
| 2,441,460 | 5/1948 | Walters ........................ 474/258 X |
| 5,224,905 | 7/1993 | Mishima ......................... 474/258 |

Primary Examiner—Thuy M. Bui
Attorney, Agent, or Firm—Wood, Phillips, VanSanten, Hoffman & Ertel

[57] ABSTRACT

A power transmission belt having a belt body defining a tension section and a compression section and having an inside surface, an outside surface, and laterally spaced side surfaces. A canvas layer is provided on at least one of the inside, outside, and side surfaces and has a first surface abutting to the belt body and a second surface that is exposed with the canvas layer on the belt body. The canvas has ends joined by thread to produce an endless layer. A first part of the thread is exposed on the second surface of the canvas layer and is at least one of a) a twine of natural fiber and b) multi-filament twine of synthetic fibers. A second part of the thread that is exposed at the first surface of the canvas layer is a mono-filament of synthetic fiber.

20 Claims, 1 Drawing Sheet

V-BELT FOR POWER TRANSMISSION

BACKGROUND OF THE INVENTION

1. Field of the Invention

This invention relates to power transmission belts and, more particularly, to a power transmission belt having a reinforcing canvas layer attached to a surface thereof.

2. Background Art

It is known to provide a reinforcing canvas layer on an exposed surface of a power transmission belt, such as a V-ribbed belt, low-edge V-belt, wrapped V-belt, etc. A rubberized canvas layer is commonly placed on the outside surface of a power transmission belt to add peripheral reinforcement thereto. The ends of the canvas layer are joined together by sewing. Typically, the ends are overlapped so that a step is defined on the outer surface of the belt.

To avoid the creation of this "step", some manufacturers leave a gap between the ends of the canvas layer. As a result, a portion of the belt body underlying the canvas layer is exposed.

In U.S. Pat. No. 5,224,905, assigned to the assignee hereof, a power transmission belt is disclosed wherein the ends of a canvas layer are abutted, edge to edge. As described more fully in that patent, this arrangement avoids localized repositioning of the load carrying cords that occurs with the sequential buildup of components over a step in a conventionally constructed canvas layer, avoids variation in the drive characteristics for the belt as when the step in the canvas layer contacts a cooperating pulley, and minimizes noise generation between the belt and cooperating pulleys, particularly at the step. While this construction permits smooth belt running and constant power transmission characteristics, it has one principal drawback.

More particularly, a problem arises in a system in which the belt is run in a reverse-bend mode. In the reverse-bend mode, the outside surface of the belt directly contacts at least one pulley in the system. For example, in serpentine drive systems on automobile engines, the outside surface of a V-ribbed belt encounters a flat pulley to effect driving thereof. While there is no step, as in the prior art, to contact a pulley and generate noise, there is still noise generated as the thread, which connects the ends of the canvas layer and protrudes outwardly of the canvas layer, encounters the pulley(s).

It is known to join the canvas layer ends using cotton thread, such as No. 40 cotton thread, to minimize noise generation as contact occurs between the thread and the system pulleys. This is commonly accomplished using known overlock machine-sewing techniques so that both the needle thread (that which is exposed on the outside surface of the canvas layer) and bobbin thread (that which is exposed on the inside surface of the canvas layer) are cotton. However, cotton thread requires twisting and thus this thread is relatively expensive as compared to mono-filament threads made from synthetic fibers having the same strength and resistance to cutting. Furthermore, cotton threads of relatively large diameter bind significantly as the threads are drawn through rubberized canvas. As a result, the sewing step is lengthened compared to that for threads of lesser diameter.

To overcome this last problem, it is known to use mono-filament threads of synthetic fiber. These threads have good strength, i.e. resistance to cutting, and are less expensive than cotton threads. Further, the mono-filament synthetic fiber threads can be drawn through the canvas layer with less resistance than cotton threads of equal strength. As a result, the sewing time is reduced. A high integrity, machine-sewn joint can thus be obtained a relatively low cost. However, the mono-filament threads made from synthetic fibers likewise have drawbacks.

The mono-filament threads of synthetic fiber are relatively inflexible compared with twines of natural fiber having the same strength and resistance to cutting and multi-filament twines of synthetic fibers spun by twisting a plurality of filaments together. When a belt using these threads is reverse bent, the canvas layer compresses along the length of the belt. The thread on the outside of the canvas layer which, in normal operation, is pressed into the canvas layer, bows outwardly and protrudes from the outer surface of the canvas layer. In so doing, it generates noise as it contacts the cooperating pulley.

SUMMARY OF THE INVENTION

After extensive research, the present invention was arrived at and solves the above problems in the prior art. It is the principal objective of the invention to improve the connection of the ends of a covering layer, such as a canvas layer, to thereby reduce noise generation between the canvas layer on the outer surface of a power transmission belt and a cooperating pulley without compromising the integrity, or power transmission capabilities, of the belt.

In one form of the invention, a power transmission belt is provided having a belt body defining a tension section and a compression section and having an inside surface, an outside surface, and laterally spaced side surfaces. A canvas layer is provided on at least one of the inside, outside, and side surfaces and has a first surface abutting to the belt body and a second surface that is exposed with the canvas layer on the belt body. The canvas has ends joined by thread to produce an endless layer. A first part of the thread is exposed on the second surface of the canvas layer and is at least one of a) a twine of natural fiber and b) multi-filament twine of synthetic fibers. A second part of the thread that is exposed at the first surface of the canvas layer is a mono-filament of synthetic fiber.

With the inventive structure, the integrity of the connection of the fabric layer ends is maintained while also providing a highly flexible belt. The thread portion on the exposed surface of the belt remains embedded in the canvas layer, even with the belt reversely bent, as when the outside surface is used to drive/be driven by a pulley. As a result, noise generation due to contact between the thread part on the outer surface of the canvas layer and the pulley(s) is minimized.

The natural fibers can be, for example, at least one of cotton, hemp, and wool. The synthetic fibers can be, for example, at least one of nylon, polyester, and aramid. The synthetic fibers in the first and second thread parts can be the same or different.

The invention is suitable for incorporation into all types of power transmission belts. For example, it can be incorporated into a V-ribbed belt, a low-edge V-belt, a wrapped V-belt, etc.

In one form, the canvas layer is a rubberized canvas that is on the outside surface of the belt body.

The ends of the canvas layer each define an edge. In one form, the edges are abutted to each other with the canvas layer assembled to the belt body. The belt has a length and the edges of the canvas layer are straight and preferably make an angle with the length of the belt from 45°–90°.

In one method of manufacture, the ends of the canvas layer are sewn together by overlock machine sewing. Other methods of manufacture are contemplated by the invention.

The compression section of the belt, in one form, is made from rubber that is at least one of NR, SBR, CR and NBR. Short reinforcing fibers can be provided in at least the compression section of the belt. The fibers may be at least one of a) a synthetic fiber that is at least one of nylon, vinylon, polyester, and aromatic polyamide and b) natural fiber that is at least one of cotton and pulp.

The canvas layer preferably is at least one of a) woven fabric, b) cord fabric, and c) nonwoven fabric made from cloth made of at least one of cotton, nylon, polyester, and aramid or yarn fabric that is a blend of at least one of i) cotton and nylon and ii) cotton and polyester.

In another form of the invention, a power transmission belt is provided having a belt body with a canvas layer on one of the surfaces thereof, with the canvas layer having ends joined to each other through the use of thread and a first surface abutting to the belt body with the canvas layer on the belt body. A first part of the thread is exposed at the first surface of the canvas layer and is a monofilament thread of synthetic fiber.

Further according to the invention, a power transmission belt is provided having a belt body with a canvas layer on at least one of the surfaces thereof, wherein the canvas layer has a first surface abutting to the belt body and a second surface that is exposed with the canvas layer on the belt body. The canvas layer has ends joined to each other through the use of thread. A first part of the thread is exposed at the second surface of the canvas layer and a second part of the thread is exposed at the first surface of the canvas layer. The first thread part is a twine, with the second thread part being a mono-filament.

DETAILED DESCRIPTION OF THE DRAWINGS

Figure 1:
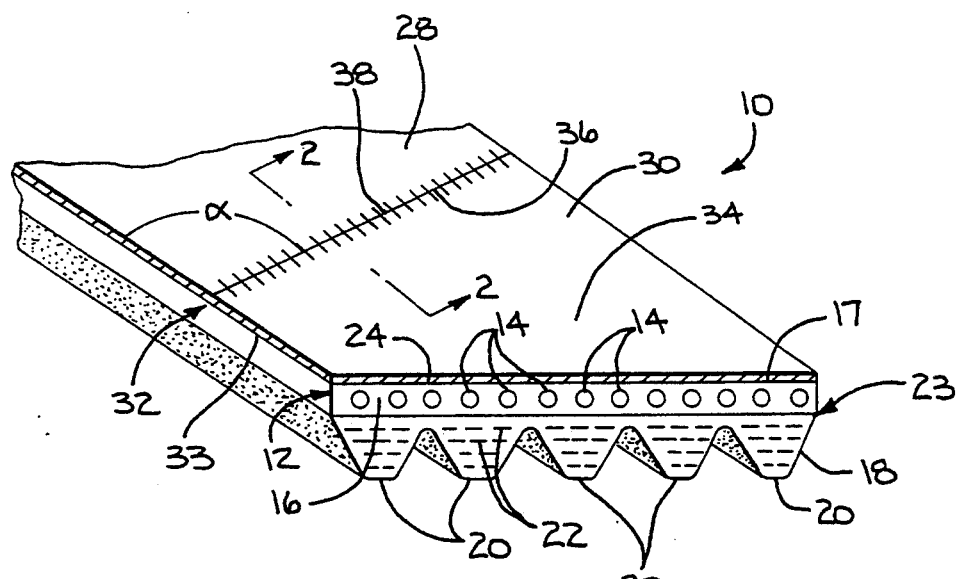
FIG. 1 is a perspective view of a section of a V-ribbed belt with a canvas layer on the outside surface thereof, according to the present invention.
Figure 2:
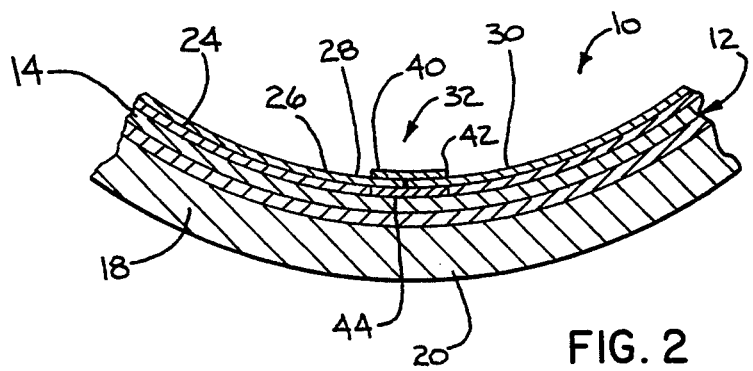
FIG. 2 is a cross-sectional view of the belt taken along line 2—2 of FIG. 1, with the belt reversely bent.

In FIGS. 1 and 2, one type of power transmission belt, in this case a V-ribbed belt, is shown at 10, made according to the present invention. It should be understood that the invention can be incorporated into virtually any type of power transmission belt i.e. a V-belt, low-edge V-belt, wrapped V-belt, etc. The depicted V-ribbed belt 10 is used only for purposes of illustrating the present invention.

The belt 10 has a tensile layer 12 which includes longitudinally extending, load carrying cords 14 which are embedded in an adhesive rubber layer 16. The tensile layer 12 defines a tension section 17 outside of the cords 14 The cords 14 are made from low elongation, high strength materials, such as nylon, polyester, aromatic polyamide, etc.

Inwardly of the adhesive rubber layer 16 is a compression section 18 in which longitudinally extending, laterally spaced ribs 20 are formed. The number and exact shape of the ribs 20 are design choices. The compression section 18 is preferably made from a rubber that is one, or a combination, of NR, SBR, CR, NBR, etc. The same rubber can be used to form the adhesive rubber layer 16.

The compression section 18 is shown to be reinforced by short, laterally extending fibers 22. The fibers 22 may be made from synthetic material, such as nylon, vinylon, polyester, aromatic polyamide, etc. Alternatively, natural fiber, such as cotton, pulp, etc. can be used.

The tensile layer 12 and compression section 18 cooperatively define a belt body 23. The outer surface 24 of the belt body 23 is covered by a cloth layer 26. The cloth layer 26 is, in the embodiment shown, a rubberized canvas made of a) a woven fabric, b) cord fabric, or c) nonwoven fabric consisting of a cloth of cotton, nylon, polyester, aramid, etc. or a blended yarn fabric of cotton and nylon, or cotton and polyester. The cloth layer 26 may be a combination of any of these cloth materials.

The canvas layer 26 has spaced ends 28, 30 which are joined together at a seam 32. A first, inside surface 34 on the canvas layer 26 abuts to the belt body 23, while an opposite surface 34 faces outwardly of the belt body 23 and is exposed to drive/be driven by a cooperating pulley (not shown).

Preferably, the canvas layer ends 28, 30 are joined in non-overlapping fashion so as not to create a step, as described in U.S. Pat. No. 5,224,905. More particularly, the end 28 has a straight edge 36 and the end 30 a straight edge 38 which are abutted to each other to create an endless band. The butted edges 36, 38 of the ends 28, 30 make an angle α with the length of the belt 10 between 45 and 90 degrees.

The seam 32 can be formed through a conventional overlock sewing-machine process, or by other techniques/apparatus, which are known to those in the art. The overlock sewing machine is commonly used to mass produce seems, as for industrial applications. With the seam 32 formed by an overlock machine, a first part 40 of the thread 42 (the needle thread) that is used to form the seam 32 is exposed at the outside surface 34 of the belt 10. A second part 44 of the thread 42 (the bobbin thread) abuts to the belt body 23.

The present invention is particularly suitable to be practiced using the overlock machine-sewing machine. The first thread part 40 is made from a twine, while the second thread part 44 is made from a mono-filament. More particularly, the first thread part 40 is made preferably from a twine of natural fiber, such as cotton, hemp, or wool, or a multi-filament twine (60 count) of synthetic fiber such as nylon, polyester, aramid fiber, etc. A mono-filament thread (30 count) of synthetic fibers, such as those of nylon, polyester, aramid, etc. is preferred for the second thread part 44.

Figure 3:
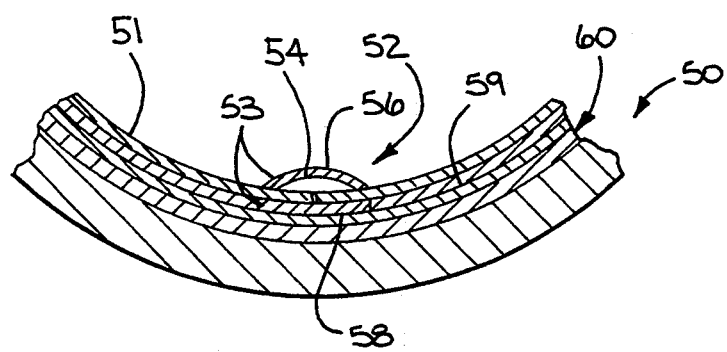
FIG. 3 is a view as in FIG. 2 showing a conventional belt that is reversely bent.

The inventive structure avoids a condition as seen in the prior art belt 50 in FIG. 3. The belt 50 has the same general construction as the belt 10 in FIGS. 1 and 2, including a reinforcing, covering canvas layer 51. The primary distinction is that the seam at 52 is defined by thread 53, including a thread part 54 exposed at the outside surface 56 of the canvas layer 51 and a thread part 58 which is abutted to the outside surface 59 of the belt body 60 and made from a monofilament thread of synthetic fiber. As can be seen, with the belt 50 reversely bent as in FIG. 3, the canvas layer 51 is compressed which causes the relatively rigid thread 54 to bow so as to project significantly outwardly from the ,outside surface 59 of the belt body 60 so that it will contact a cooperating pulley surface and thereby generate noise in use.

On the other hand, with the inventive belt 10 reversely bent, as shown in FIG. 2, the more flexible thread part 40, upon being compressed, assumes the curvature of the outside surface 24 of the belt body 23 and remains embedded in the canvas layer 26 so as not to project significantly outwardly therefrom as to interfere with a cooperating pulley.

The foregoing disclosure of specific embodiments is intended to be illustrative of the broad concepts comprehended by the invention.

We claim:

1. A power transmission belt comprising:
    a belt body defining a tension section and a compression section and having an inside surface, an outside surface, and laterally spaced side surfaces; and
    a canvas layer on at least one of the inside, outside, and side surfaces,
    said canvas layer having a first surface abutting to the belt body and a second surface that is exposed with the canvas layer on the belt body,
    wherein the canvas layer has ends joined to each other through the use of thread,
    there being a first part of said thread that is exposed on the second surface of the canvas layer, said first thread part comprising at least one of a) a twine of natural fibers, and b) multi-filament twine of synthetic fibers.

2. The power transmission belt according to claim 1 wherein there is a second part of said thread that is exposed at the first surface of the canvas layer, said second thread part comprising a mono-filament thread of synthetic fibers.

3. The power transmission belt according to claim I wherein the natural fibers comprise at least one of cotton, hemp, and wool.

4. The power transmission belt according to claim 2 wherein the synthetic fibers in at least one of the first and second thread parts comprise at least one of nylon, polyester, and aramid.

5. The power transmission belt according to claim 2 wherein the synthetic fibers in the first and second thread parts are the same.

6. The power transmission belt according to claim 2 wherein the synthetic fibers in the first and second thread parts are different.

7. The power transmission belt according to claim 1 wherein the power transmission belt is one of a V-ribbed belt, a low-edge V-belt, and a wrapped V-belt.

8. The power transmission belt according to claim 1 wherein the canvas layer comprises rubberized canvas that is on the outside surface of the belt body.

9. The power transmission belt according to claim 1 wherein the ends of the canvas layer each define a free edge and the free edges of the canvas layer ends are abutted to each other with the canvas layer assembled to the belt body.

10. The power transmission belt according to claim 1 wherein the ends of the canvas layer are sewn together by overlock machine-sewing.

11. The power transmission belt according to claim 1 wherein the compression section is made from rubber that is at least one of NR, SBR, CR and NBR.

12. The power transmission belt according to claim 11 wherein there are reinforcing fibers in the rubber of the compression section, said reinforcing fibers comprising at least one of a) synthetic fibers that are at least one of nylon, vinylon, polyester and aromatic polyamide and b) natural fibers that are at least one. of cotton and pulp.

13. The power transmission belt according to claim 1 wherein the canvas layer comprises at least one of a) a woven fabric, b) cord fabric, and c) nonwoven fabric comprising cloth made of at least one of cotton, nylon, polyester, and aramid and yarn fabric that is a blend of at least one of i) cotton and nylon and ii) cotton and polyester.

14. The power transmission belt according to claim 9 wherein the belt has a length and the free edges of the canvas layer are straight and make an angle with the length of the belt from 45–90°.

15. A power transmission belt comprising:
    a belt body defining a tension section and a compression section and having an inside surface, an outside surface, and laterally spaced side surfaces; and
    a canvas layer on at least one of the inside, outside, and side surfaces,
    said canvas layer having a first surface abutting to the belt body and a second surface that is exposed with the canvas layer on the belt body,
    wherein the canvas layer has ends joined to each other through the use of thread,
    there being a first pan of said thread that is exposed at the first surface of the canvas layer, said first thread part comprising a mono-filament thread of synthetic fibers.

16. A power transmission belt comprising:
    a belt body defining a tension section and a compression section and having an inside surface, an outside surface, and laterally spaced side surfaces; and
    a canvas layer on at least one of the inside, outside, and side surfaces,
    said canvas layer having a first surface abutting to the belt body and a second surface that is exposed with the canvas layer on the belt body,
    wherein the canvas layer has ends joined to each other through the use of thread,
    there being a first part of said thread that is exposed on the second surface of the canvas layer and a second part of said thread that is exposed at the first surface of the canvas layer,
    said first thread part comprising a twine,
    said second thread part comprising a mono-filament.

17. The power transmission belt according to claim 16 wherein the power transmission belt is one of a V-ribbed belt, a low-edge V-belt, and a wrapped V-belt.

18. The power transmission belt according to claim 16 wherein the canvas layer comprises rubberized canvas that is on the outside surface of the belt body.

19. The power transmission belt according to claim 16 wherein the ends of the canvas layer each define a free edge and the free edges of the canvas layer ends are abutted to each other with the canvas layer assembled to the belt body.

20. The power transmission belt according to claim 16 wherein the canvas layer comprises at least one of a) a woven fabric, b) cord fabric, and c) nonwoven fabric comprising cloth made of at least one of cotton, nylon, polyester, and aramid and yarn fabric that is a blend of at least one of i) cotton and nylon and ii) cotton and polyester.

* * * * *